(12) United States Patent
Wood

(10) Patent No.: US 8,332,639 B2
(45) Date of Patent: Dec. 11, 2012

(54) DATA ENCRYPTION OVER A PLURALITY OF MPLS NETWORKS

(75) Inventor: Daniel M. Wood, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1318 days.

(21) Appl. No.: 11/609,103

(22) Filed: Dec. 11, 2006

(65) Prior Publication Data
US 2008/0137845 A1 Jun. 12, 2008

(51) Int. Cl.
*H04L 29/06* (2006.01)
(52) U.S. Cl. .......................... 713/168; 726/14; 713/153
(58) Field of Classification Search .............. 380/255, 380/258, 270; 713/150, 153, 154, 155, 160, 713/168; 726/11, 12, 13, 14, 22
See application file for complete search history.

(56) References Cited

U.S. PATENT DOCUMENTS

| | | | |
|---|---|---|---|
| 6,742,015 B1 | 5/2004 | Bowman-Amuah | |
| 6,839,320 B2 | 1/2005 | Paridaens | |
| 7,120,165 B2* | 10/2006 | Kasvand-Harris et al. | 370/466 |
| 7,209,473 B1* | 4/2007 | Mohaban et al. | 370/352 |
| 7,477,657 B1* | 1/2009 | Murphy et al. | 370/468 |
| 2001/0019554 A1* | 9/2001 | Nomura et al. | 370/389 |
| 2003/0212768 A1 | 11/2003 | Sullivan | |
| 2004/0156313 A1* | 8/2004 | Hofmeister et al. | 370/229 |
| 2004/0172464 A1* | 9/2004 | Nag | 709/223 |
| 2004/0221051 A1* | 11/2004 | Liong et al. | 709/230 |
| 2005/0177749 A1* | 8/2005 | Ovadia | 713/201 |
| 2005/0220014 A1* | 10/2005 | DelRegno et al. | 370/230 |
| 2005/0223111 A1* | 10/2005 | Bhandaru et al. | 709/236 |
| 2005/0255850 A1* | 11/2005 | Auterinen | 455/452.2 |
| 2005/0261934 A1 | 11/2005 | Thompson | |
| 2005/0262264 A1* | 11/2005 | Ando et al. | 709/233 |
| 2006/0020787 A1* | 1/2006 | Choyi et al. | 713/165 |
| 2006/0112425 A1* | 5/2006 | Smith et al. | 726/13 |
| 2006/0123225 A1* | 6/2006 | Sharma et al. | 713/153 |
| 2006/0198368 A1* | 9/2006 | Guichard et al. | 370/389 |
| 2007/0206602 A1* | 9/2007 | Halabi et al. | 370/395.4 |
| 2007/0274286 A1* | 11/2007 | Krishnan | 370/351 |
| 2008/0101367 A1* | 5/2008 | Weinman | 370/392 |
| 2009/0168783 A1* | 7/2009 | Mohan et al. | 370/395.5 |

OTHER PUBLICATIONS

Rosen et al., "Multiprotocol Label Switching Architecture", Request for Comments: 3031, Network Working Group, Jan. 2001.*
Simpson, "PPP Challenge Handshake Authentication Protocol (CHAP)", Request for Comments: 1994, Network Working Group, 1996.*
Andersson et al., "LDP Specification", Request for Comments: 3036, Network Working Group, Jan. 2001.*
Harkins et al., "The Internet Key Exchange" (IKE), Request for Comments: 2409, Network Working Group, Nov. 1998.*

* cited by examiner

*Primary Examiner* — Eleni Shiferaw
*Assistant Examiner* — Hilary Branske

(57) ABSTRACT

A network device negotiates an encryption protocol with another network device, receives data from a trusted client device, encrypts the received data with the negotiated encryption protocol, and applies a label switched path (LSP) label to the encrypted data for transmission to the network device through an untrusted Multiprotocol Label Switching (MPLS) network.

14 Claims, 6 Drawing Sheets

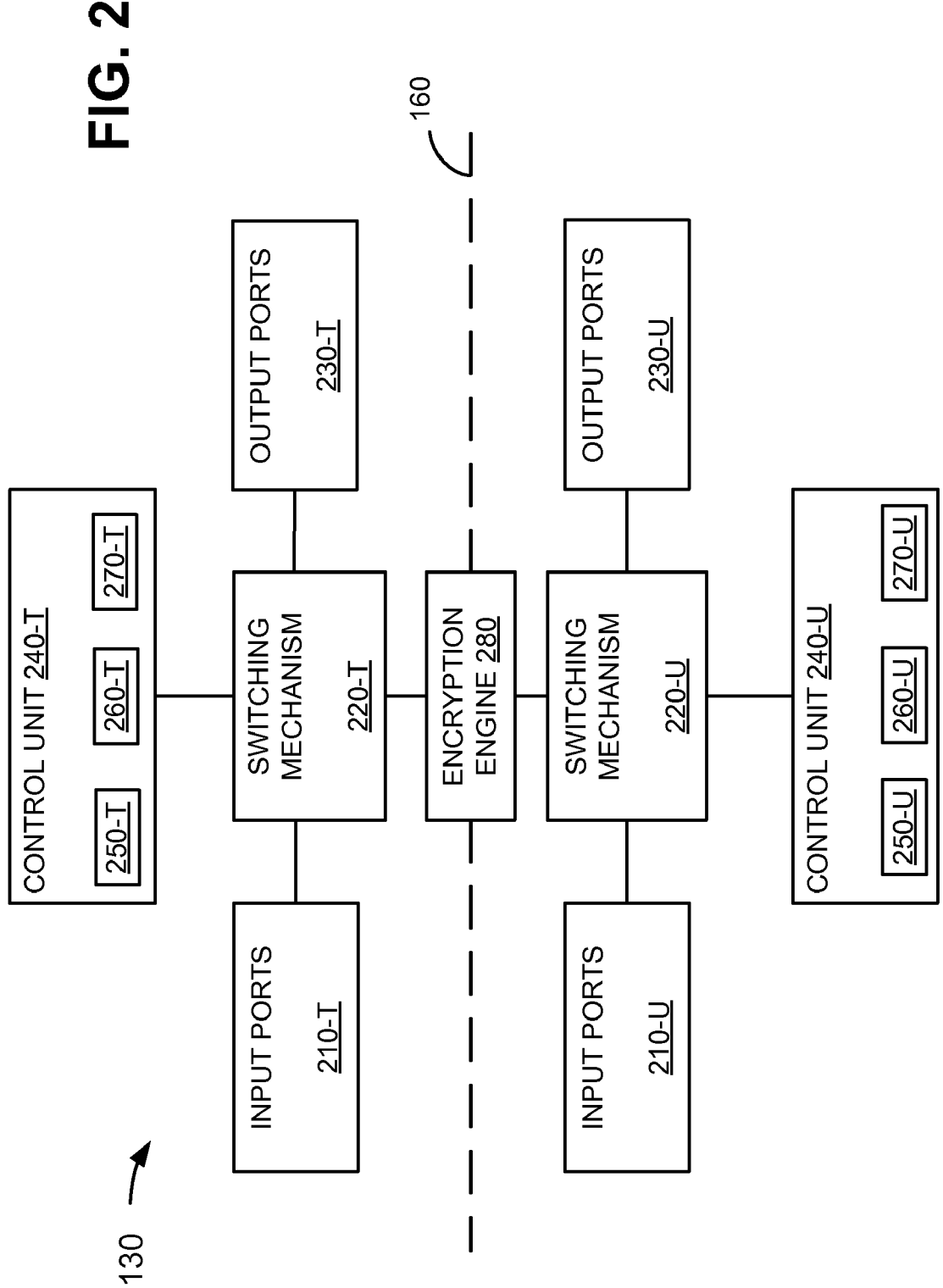

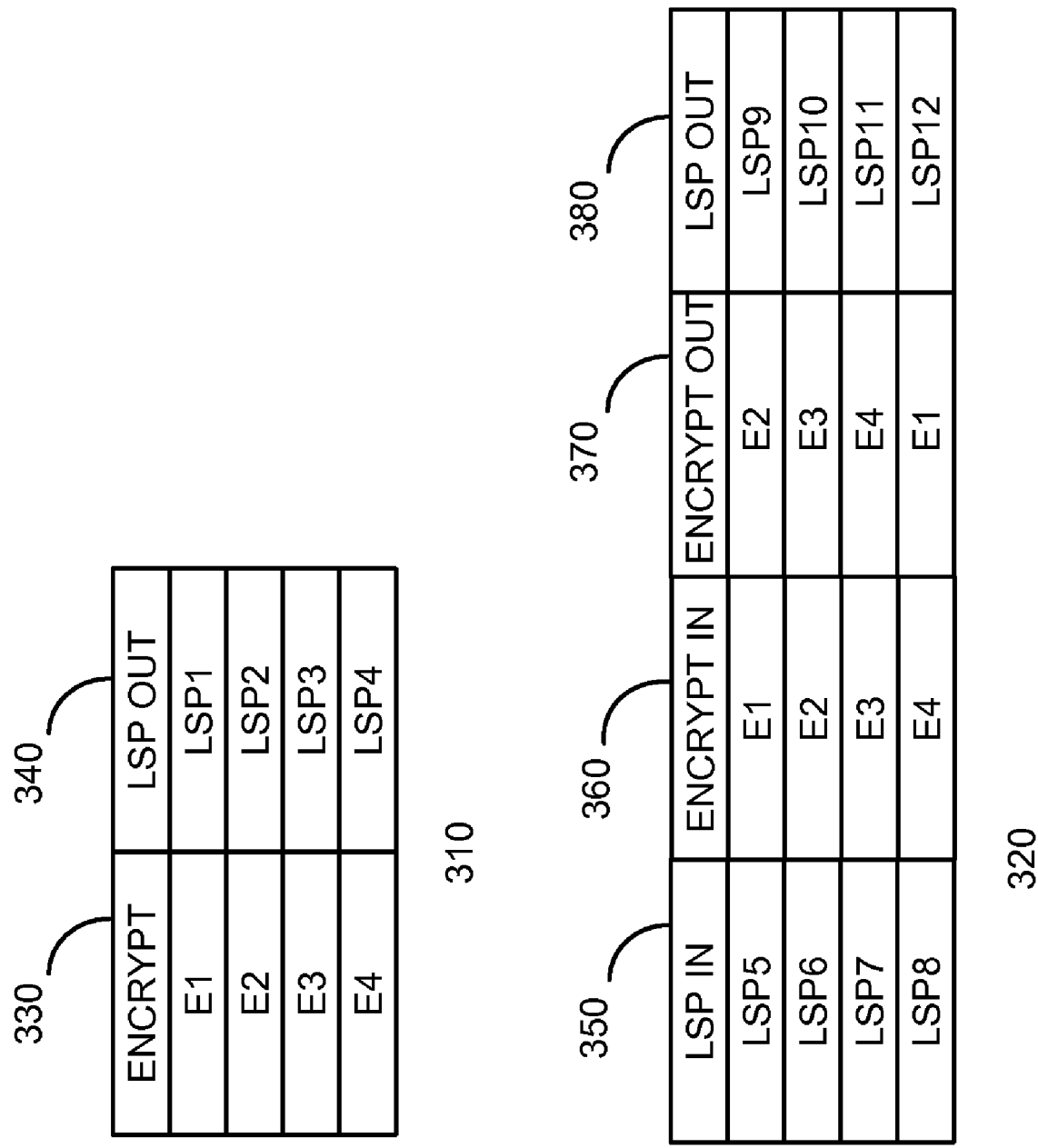

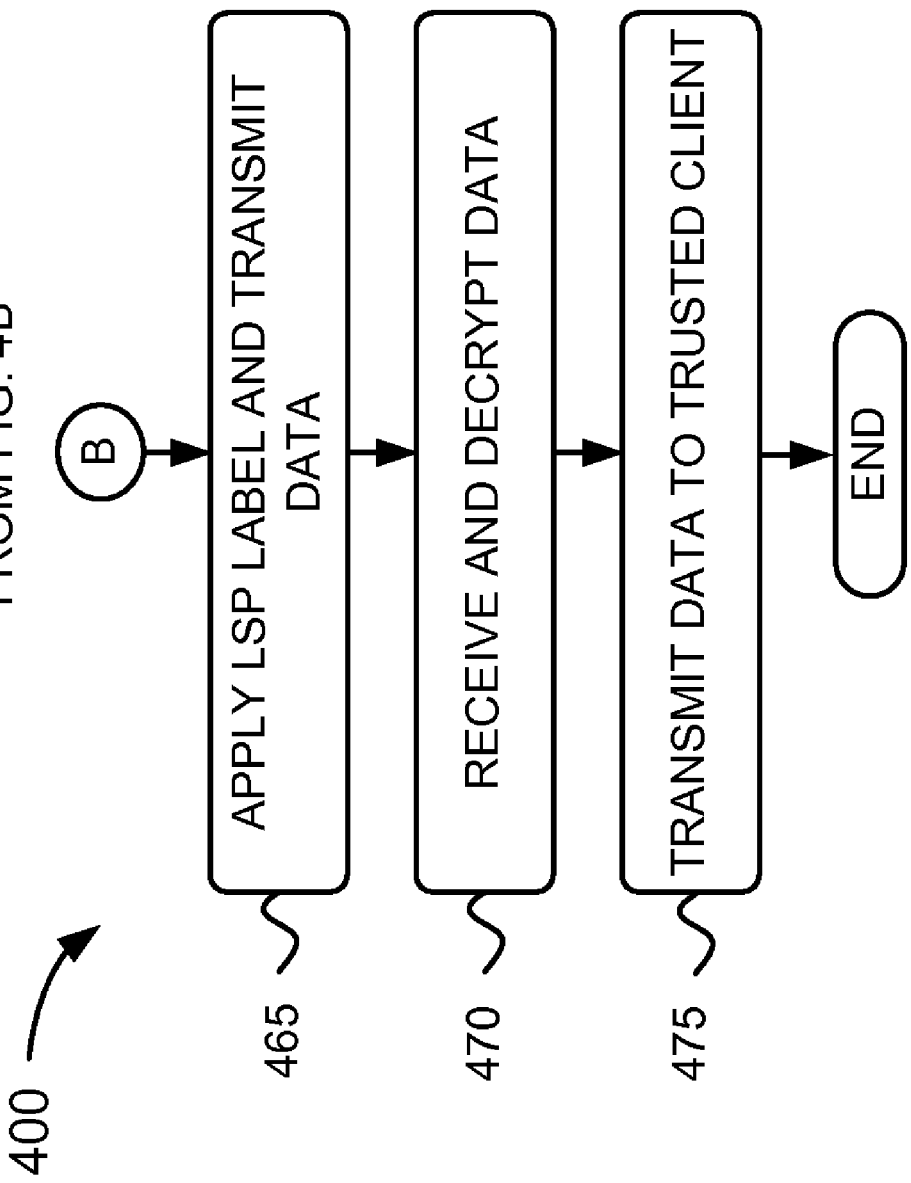

DATA ENCRYPTION OVER A PLURALITY OF MPLS NETWORKS

BACKGROUND INFORMATION

In order to encrypt data over a group of networks, data encryption at the IP layer may be performed by each network resulting in multiple layers of encryption. Each layer of data encryption adds additional data that must be transmitted over the networks, thereby increasing the amount of time necessary to transmit data over the networks. Further, even if only one type of data encryption is performed, substantial information is added to the packet headers of the encrypted data, thereby increasing the processing required by network devices.

BRIEF DESCRIPTION OF THE DRAWINGS

FIG. 2 is an exemplary diagram of a Multiprotocol Label Switching (MPLS) encryption device of FIG. 1;

FIG. 3 shows exemplary data tables that may be stored in the exemplary MPLS encryption device of FIG. 2; and FIGS. 4A-4C are flow diagrams illustrating exemplary processing performed by the system of FIG. 1.

DETAILED DESCRIPTION

The following detailed description of the exemplary embodiments refers to the accompanying drawings. The same reference numbers in different drawings may identify the same or similar elements. Also, the following detailed description does not limit the embodiments. Systems and methods described herein may provide data encryption over a group of untrusted MPLS networks.

Figure 1:
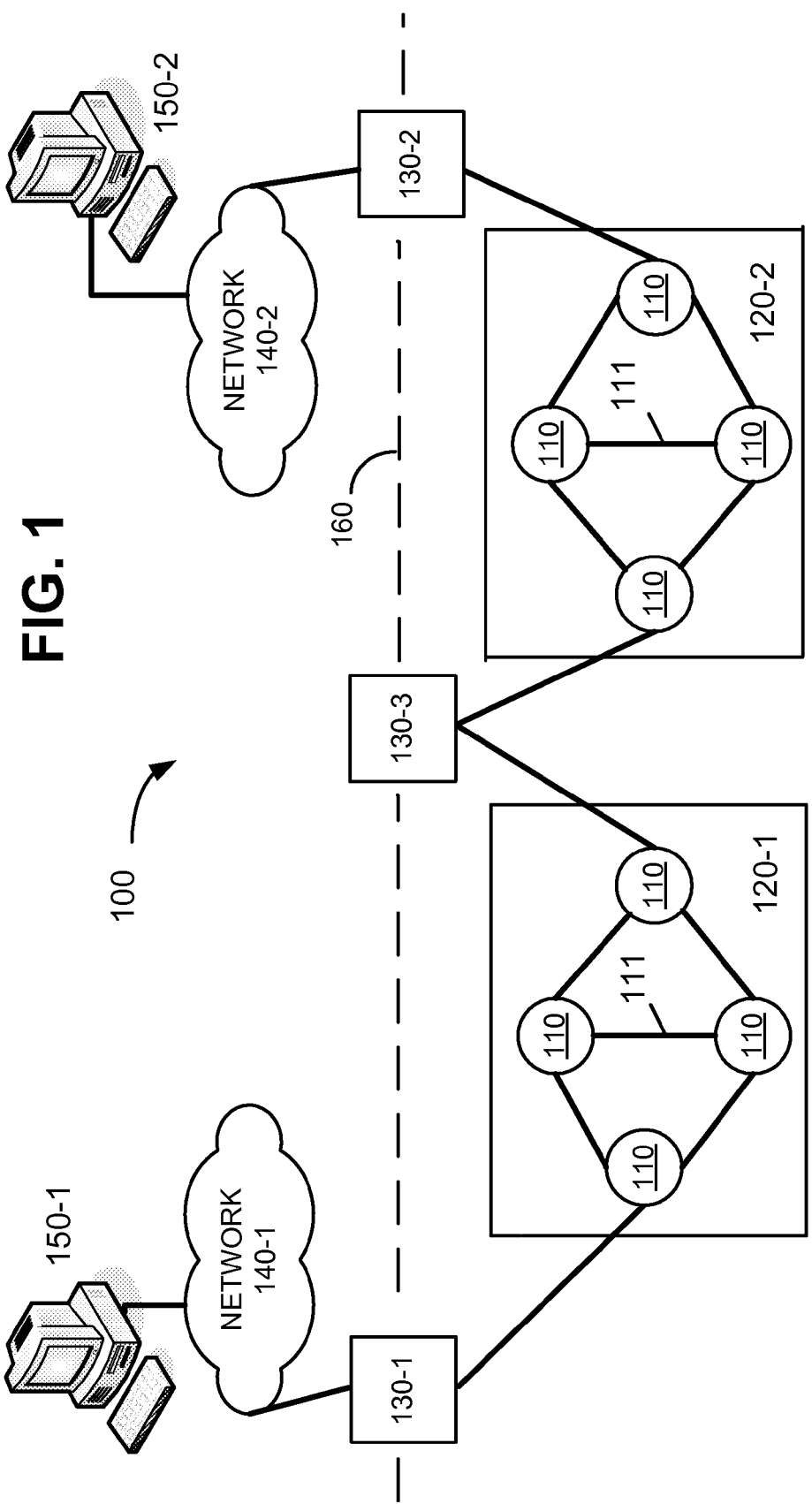
FIG. 1 is a diagram illustrating an exemplary system in which systems and methods described herein may be implemented.

FIG. 1 is a diagram illustrating an exemplary system 100 in which systems and methods described herein may be implemented. In one implementation, system 100 may include, for example, a group of network devices 110 connected by a group of links 111 that may form MPLS networks 120-1 and 120-2 (referred to collectively as "MPLS networks 120"). System 100 may further include a group of MPLS encryptors 130-1, 130-2 and 130-3 (referred to collectively as "MPLS encryptors 130"), a group of networks 140-1 and 140-2 (referred to collectively as networks 140"), and a group of client devices 150-1 and 150-2 (referred to collectively as client devices 150"). It should be understood that the number of components shown in system 100 is exemplary. In practice system 100 may include more or fewer components than shown in FIG. 1.

Network devices 110 may include any network device, such as a computer, a router, a switch, a network interface card (NIC), a hub, a bridge, etc. In one implementation, network devices 110 may include label switching routers (LSRs). Network devices 110 may include one or more input ports and output ports that permit communications to other network devices 110. Network devices 110 may be connected via links 111. Links 111 may include one or more paths that permit communications between network devices 110, such as wired, wireless, and/or optical connections. A network device configured as a LSR, for example, may receive datagrams from MPLS encryptor 130. A "datagram(s)" may include any type or form of data, such as packet or non-packet data. Each network device 110 may be configured as a LSR along a label switched path (LSP), and may make a forwarding decision based on the label carried in the MPLS header (e.g., a MPLS shim header). That is, the datagram forwarding process may be based on the concept of label switching. In this way, a LSP may identify the specific path of network devices 110 and links 111 that a datagram(s) takes through MPLS network 120. The labeled datagram may be forwarded along the LSP by each network device 110, for example, until it eventually arrives at MPLS encryptor 130, which may be configured as an egress LSR. The MPLS header may be removed from the datagram by either egress MPLS encryptor 130 or by the LSR (e.g., network device 110) preceding MPLS encryptor 130.

To optimize the route or path selection process, the physical path of a LSP may not be restricted to the shortest path that one or more routers executing an interior gateway protocol (IGP) would select to reach a destination. The physical path for a LSP may be defined using an explicit route. An explicit route may be a preconfigured sequence of network devices 110 (i.e., LSRs) that define the physical path of the LSP. Explicit routes may allow physical paths to be defined that override the shortest path routes established by conventional IP routing (e.g., by IGPs). For example, explicit routes may be used to route traffic around congested points in networks 120, to optimize resource utilization across networks 120, and/or to satisfy network and administrative policy constraints.

Networks 120 may include a group of network devices 110 interconnected by links 111 that may form a MPLS network as described above. While four network devices 110 and five links 111 are shown in each network 120, more or fewer network devices 110 and links 111 may be used in other implementations. Networks 120 may also include other devices (not shown) that aid in forwarding data through network 120.

MPLS encryptors 130 may include one or more devices for receiving, encrypting and transmitting data between networks. In one implementation, MPLS encryptors 130 may be configured as ingress LSRs (entry points of datagrams), and/or egress LSRs (exit points of datagrams) for networks 120. MPLS encryptors 130 may receive datagrams, and may classify the datagrams, based on a variety of factors, into a forwarding equivalent class (FEC). A FEC may include a set of datagrams that may be treated the same for forwarding purposes and may be mapped to a single label. A datagram(s) may be encapsulated in a MPLS header that may contain a short, fixed-length, locally-assigned label that may be based on the FEC. MPLS encryptors 130 may forward a datagram(s) with the MPLS header to the next-hop LSR, e.g., to a next network device 110.

Networks 140 may include one or more networks including an Internet-protocol (IP) network, a metropolitan area network (MAN), a wide area network (WAN), a local area network (LAN), or a combination of networks. In one implementation, networks 140 may be referred to as private or trusted networks. Networks 140 may also include devices, such as switches, routers, firewalls, gateways, and/or servers (not shown), used to transmit/receive data to/from other connected network devices.

Networks 140 may be hardwired using wired conductors and/or optical fibers, and/or may be wireless using free-space optical and/or radio frequency (RF) transmission paths. Implementations of networks 140 and/or devices operating on networks 140 described herein are not limited to any particular data type and/or protocol.

Client devices 150 may include one or more devices that allow users to establish data connections and voice and/or video calls with other users. Client devices 150 may include personal computers, laptops, personal digital assistants (PDAs), telephone devices, and/or other types of communication devices.

Boundary 160, illustrated in FIG. 1 as a dashed line, may define a boundary between trusted and untrusted networks (e.g., networks 120 and 140) and devices. For example, networks 140 may be referred to as "trusted" networks, client devices 160 may be referred to as "trusted" clients, and networks 120 may be referred to as "untrusted" networks. For example, a trusted network may be a private network and an untrusted network may be a public network, such as the Internet.

FIG. 2 is an exemplary diagram of a single MPLS encryptor 130. MPLS encryptor 130 may include input ports 210, switching mechanisms 220, output ports 230, control units 240 and encryption engine 280. Boundary 160 (as also shown in FIG. 1 as a dashed line) may define a boundary between trusted and untrusted portions of MPLS encryptor 130. For example, input ports 210, switching mechanism 220, output ports 230, and control unit 240 above line 160 may be referred to as "trusted" input ports 210-T, "trusted" switching mechanism 220, "trusted" output ports 230-T, and "trusted" control unit 240-T. Likewise, input ports 210, switching mechanism 220, output ports 230, and control unit 240 below line 160 may be referred to as "untrusted" input ports 210-U, "untrusted" switching mechanism 220-U, "untrusted" output ports 230-U, and "untrusted" control unit 240-U. Encryption engine 280 may perform encryption and decryption of data received from both trusted and untrusted sides of MPLS encryptor 130.

Input ports 210 may connect to networks 120 and 140 to receive data. For example, trusted input ports 210-T may receive data from a trusted network, such as network 140-1, and untrusted input ports 210-U may receive data from an untrusted network, such as network 120-1. Input ports 210 may include logic to carry out datalink layer encapsulation and decapsulation. Input ports 210 may also include logic to forward received data to switching mechanisms 220. Input ports 210 may receive data from networks 120 and 140 and may run datalink-level protocols and/or a variety of higher level protocols.

Switching mechanisms 220 may receive data from input ports 210 and determine a connection to output ports 230. Switching mechanisms 220 may be controlled by control units 240 in order to switch data to trusted output ports 230-T or switch data to untrusted output ports 230-U. Switching mechanisms 220 may be implemented using many different techniques. For example, switching mechanisms 220 may be implemented using busses, crossbars, and/or shared memories. A bus may link input ports 210 and output ports 230. A crossbar may provide multiple simultaneous data paths through each switching mechanism 220. In a shared-memory arrangement, incoming datagrams may be stored in a shared memory and pointers to datagrams may be switched. Switching mechanisms 220 may also provide data to encryption engine 280 for data encryption and decryption as described below.

Output ports 230 may connect to networks 120 and 140 for data transmission. For example, trusted output ports 230-T may output data to be transmitted over a trusted network, such as network 140-1, and untrusted output ports 230-U may output data to be transmitted over an untrusted network, such as network 120-1. Output ports 230 may include logic executing scheduling algorithms that support priorities and guarantees, and may run datalink-level protocols and/or a variety of higher level protocols.

Control units 240 may control switching mechanisms 220 to interconnect input ports 210 to output ports 230, via encryption engine 280. For example, untrusted control unit 240-U may enable untrusted switching mechanism 220-U to connect untrusted input port 210-U to untrusted output port 230-U via encryption engine 280. In another example, trusted control unit 240-T may enable trusted switching mechanism 220-T to direct a transmission from trusted input port 210-T through encryption engine 280 to untrusted switching mechanism 220-U for connection to untrusted output port 230-U. In still another example, trusted control unit 240-T may also enable trusted switching mechanism 220-T to connect trusted input port 210-T to trusted output port 230-T. Control units 240 may also implement routing protocols, and/or run software to configure transmissions between networks 120 and 140. Control units 240 may further control communications between MPLS encryptors 130. For example, control units 240 may control transmissions to negotiate LSP labels and encryption protocols.

In one implementation, each control unit 240 may include a transmission guard 250, a processor 260 and a memory 270. Transmission guard 250 may include hardware and software mechanisms that may direct or prohibit transmissions between trusted and untrusted networks. For example, transmission guard 250 may direct transmissions from trusted networks 140 through switching mechanisms 220 and encryption engine 280 to untrusted networks 120. Transmission guard 250 may also block entrance of transmissions from untrusted networks 120 into trusted networks 140. Processor 260 may include a microprocessor or processing logic that may interpret and execute instructions. Memory 270 may include a random access memory (RAM), a read-only memory (ROM) device, a magnetic and/or optical recording medium and its corresponding drive, and/or another type of static and/or dynamic storage device that may store information and instructions for execution by processor 260. Memory 270 may also store a label information base (LIB) that may contain a group of LSP labels and encryption protocol information, as described below.

Encryption engine 280 may encrypt and decrypt data that may be transmitted or received from other MPLS encryptors 130. Encryption engine 280 may include one or more stored programs that include encryption protocols for encrypting and decrypting data. In order to set up a LSP through a network 120, each of the trusted and untrusted sides of MPLS encryptors 130 may set up a LIB in memory 270, which may map data to an outgoing LSP label as described below. Referring to FIG. 3, for example, data table or LIB 310 may be stored in trusted memory 270-T of the trusted side of MPLS encryptors 130, and may contain two associated columns in a table. Data table or LIB 320 may be stored in untrusted memory 270-U of the untrusted side of MPLS encryptors 130, and may contain four associated columns in a table.

In one example, data table 310 may be used to map received data from trusted network 140-1, to a LSP label for transmission through untrusted network 120-1. Data table 310 may include an encrypt column 330 and a LSP out column 340. Encrypt column 330 of data table 310 may contain information identifying a defined encryption program and/or protocol. For example, encrypt column 330 may include "E1," "E2," "E3," and "E4," which may represent information identifying four different encryption protocols that may be stored in encryption engine 280.

LSP out column 340 may contain a LSP label associated with a connection through network 120-1. Each LSP label may be associated with a corresponding encryption protocol in encrypt column 330, where the corresponding encryption protocol in encrypt column 330 may be used for data encryption. For example, LSP out column 340 may store LSP labels "LSP1," "LSP2," "LSP3," and "LSP4," which may be used to establish connections through untrusted network 120-1. For example, data received from trusted network 140-1 may be encrypted using encryption protocol "E3," and LSP label "LSP3" may be applied to the encrypted data for transmission through untrusted network 120-1.

Data table 320 may include a LSP in column 350, an encrypt in column 360, an encrypt out column 370, and a LSP out column 380. Data table 320 may be used to map data received from a first untrusted network (e.g., network 120-1), with an incoming LSP label and incoming encryption protocol, to an outgoing encryption protocol and outgoing LSP label for transmission through a second untrusted network (e.g., network 120-2).

LSP in column 350 of data table 320 may contain information identifying a LSP label received through untrusted input port 210-U. For example, LSP in column 350 may store LSP labels "LSP5," "LSP6," "LSP7," and "LSP8," which may identify LSP labels that may be received from untrusted network 120-1. Incoming data with LSP labels in LSP in column 350 may be mapped to corresponding outgoing LSP labels in LSP out column 380.

Encrypt in column 360 of data table 320 may contain information identifying an incoming encryption protocol. For example, encrypt in column 360 may store "E1," "E2," "E3," and "E4," which may represent information identifying four different encryption programs and/or protocols that may be stored in encryption engine 280.

Encrypt out column 370 of data table 320 may contain information identifying an outgoing encryption program and/or protocol. For example, encrypt out column 370 may store "E2," "E3," "E4," and "E1," which may represent information identifying four different encryption protocols that may be stored in encryption engine 280.

LSP out column 380 may contain LSP labels used to label data for transmission through untrusted network 120-2. For example, LSP out column 380 may store LSP labels "LSP9," "LSP10," "LSP11" and "LSP12," which may be used to transmit data through untrusted network 120-2. For example, if data is received from untrusted network 120-1 through untrusted port 230-U with incoming label "LSP7" and encryption protocol "E3," the data may be decrypted using encryption protocol "E3," re-encrypted using corresponding encryption protocol "E4," and outgoing label "LSP11" may be applied to the data for transmission through untrusted network 120-2. The LIB data tables in trusted and untrusted sides of MPLS encryptors 130 shown in FIG. 3 are provided for explanatory purposes only. Data tables 310 and 320 may include additional information than is illustrated in FIG. 3. The entries in data tables 310 and 320 may be created as described below with reference to FIGS. 4A-4C.

Using data table 310, data received via trusted input port 210-T may pass through encryption engine 280, for encryption, prior to being sent to untrusted output port 230-U, for transmission through untrusted network 120. Using data table 320, data received from untrusted network 120-1, via untrusted input port 210-U, may be decrypted and re-encrypted by encryption engine 280 and sent to untrusted output port 230-U, for transmission through untrusted network 120-2.

After data has been encrypted, labeled, and output by MPLS encryptors 130, network devices 110 may forward the data as a datagram(s) along links 111 through MPLS networks 120 based on the applied LSP label. A LSP label may be swapped to a new label at each network device 110. In this way, a LSP label may identify the specific path of network devices 110 and links 111 that a datagram(s) may take through MPLS network 120.

MPLS encryptors 130 described herein may perform certain operations, as described in detail below. Each MPLS encryptor 130 may perform these operations in response to processor 260 executing software instructions contained in a computer-readable medium, such as memory 270.

The software instructions may be read into memory 270 from another computer-readable medium, such as a data storage device, or from another device via a communication interface. The software instructions contained in memory 270 may cause processor 260 to perform processes that will be described later. Alternatively, hardwired circuitry may be used in place of or in combination with software instructions to implement processes consistent with principles of various embodiments. Thus, implementations consistent with principles of exemplary embodiments are not limited to any specific combination of hardware circuitry and software.

Figure 4A:
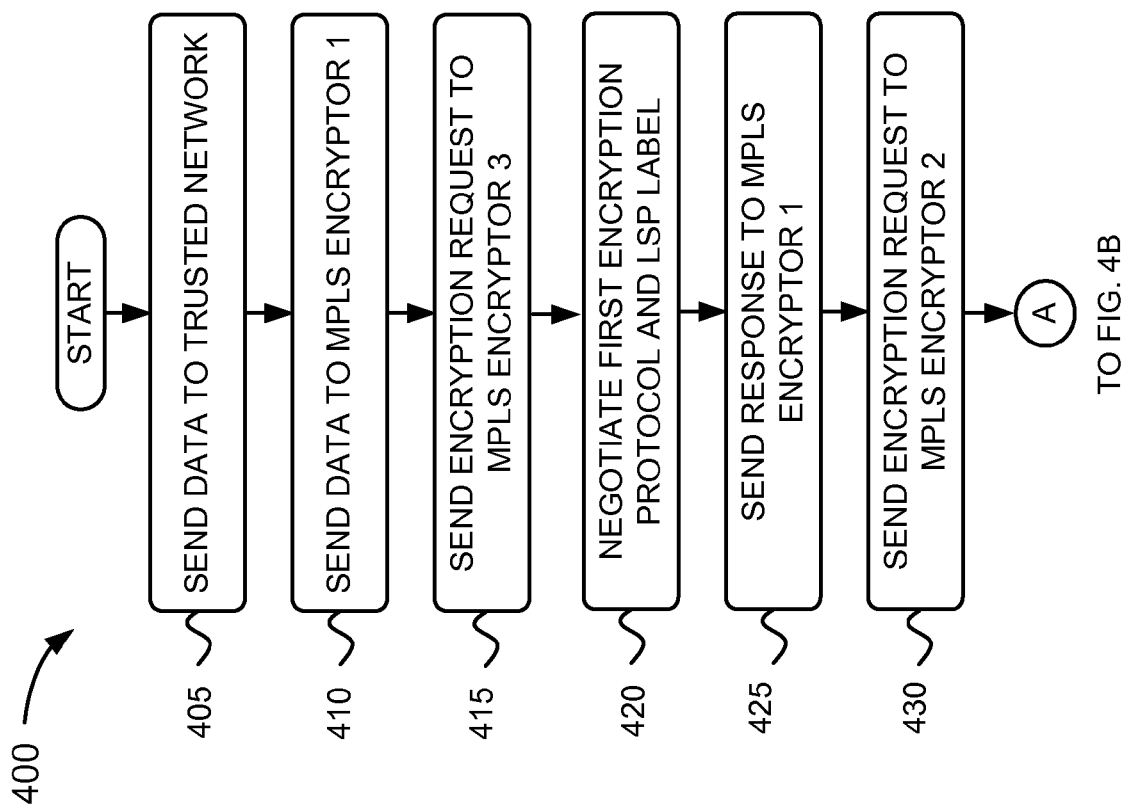
Figure 4B:
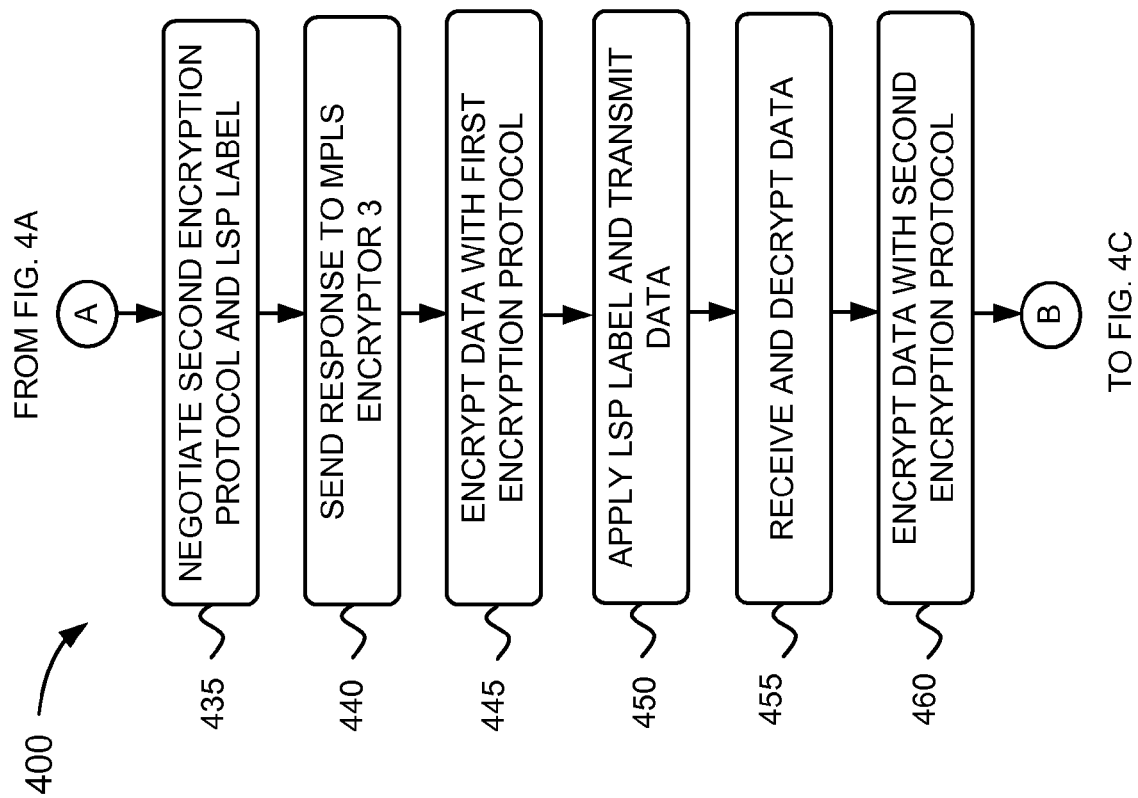

FIGS. 4A to 4C illustrate exemplary processing 400 performed by system 100. In one implementation for example, processing 400 may begin when a trusted client, such as trusted client 150-1, sends data to a trusted network, such as network 140-1 (act 405). For example, trusted client 150-1 may desire to communicate with and establish a connection to trusted client 150-2. Trusted network 140-1 may then send data to MPLS encryptor 130-1 (act 410). In response to receiving this data, MPLS encryptor 130-1 may send an encryption request signal to MPLS encryptor 130-3 (act 415). For example, MPLS encryptor 130-1 may send a signal to MPLS encryptor 130-3 indicating a specific encryption protocol.

Upon receiving this encryption request signal, MPLS encryptors 130-1 and 130-3 may negotiate a first encryption protocol and determine a first LSP label (act 420). For example, MPLS encryptor 130-3 may access memory 270 to determine stored encryption protocols and initiate a LSP label. MPLS encryptor 130-3 may then transmit a response to MPLS encryptor 130-1 (act 425). This response may include information confirming the first encryption protocol and the first LSP label that may be used for communications between encryptors 130-1 and 130-3 through network 120-1. For example, MPLS encryptor 130-3 may respond to MPLS encryptor 130-1 with information indicating encryption protocol "E3" and LSP label "LSP3," which may be stored in data table 310, as shown in FIG. 3.

In order to transmit data through network 120-2, MPLS encryptor 130-3 may send an encryption request signal to MPLS encryptor 130-2 (act 430). Upon receiving the encryption request signal, MPLS encryptors 130-2 and 130-3 may negotiate a second encryption protocol and determine a second LSP label (act 435) (FIG. 4B). For example, MPLS encryptor 130-2 may access memory 270 to determine stored encryption protocols and to initiate a LSP label. MPLS encryptor 130-2 may then transmit a response to MPLS encryptor 130-3 (act 440). The response may include information indicating the second encryption protocol and the second LSP label that may be used for communications between encryptors 130-3 and 130-2 through network 120-2. For example, MPLS encryptor 130-2, may respond to MPLS encryptor 130-3 with information indicating encryption protocol "E4" and LSP label "LSP11," which may be stored in data table 320 of MPLS encryptor 130-3.

MPLS encryptor 130-1 may encrypt data from trusted client 140-1 with the first encryption protocol (act 445). For example, encryption engine 280 may encrypt data using the first negotiated encryption protocol (e.g., "E3") as indicated in data table 310 (as determined in act 420). After the data is encrypted, the LSP label negotiated in act 420 may be applied and data may be transmitted (act 450). For example, using data table 310, MPLS encryptor 130-1 may apply LSP label "LSP3" to data encrypted with encryption protocol "E3." The transmitted data may be received and decrypted by MPLS encryptor 130-3 (act 455). For example, using data table 320, data received on LSP label "LSP7" may be decrypted using encryption protocol "E3." Once decrypted, the data may be encrypted using the second encryption protocol (act 460). For example, encryption protocol "E4" stored in data table 320, (as negotiated in act 435) may be used.

After being encrypted with the second encryption protocol, a LSP label may be applied and the data may be transmitted (act 465). For example, using the associated columns 370 and 380 of data table 320, the negotiated encryption protocol and LSP label may be applied by MPLS encryptor 130-3 for transmission to MPLS encryptor 130-2. For example, LSP label "LSP11" may be applied to the data that may be transmitted and encrypted using encryption protocol "E4." The data transmitted by MPLS encryptor 130-3 may be received and decrypted by MPLS encryptor 130-2 (act 470). For example, MPLS encryptor 130-2 may decrypt the received data using the negotiated encryption protocol determined in act 435 and stored in data table 320. After decryption, the data may then be transmitted to trusted client 140-2 (act 475).

In this manner, process 400 may provide data encryption for communications between two trusted networks (140-1 and 140-2) over a group of untrusted networks 120. It should also be understood that process 400 is exemplary, and more than two untrusted MPLS networks 120 may be included between trusted networks 140, for example. In this case, the exemplary acts as described above may also be applied to all of the networks. For example, MPLS encryptor 130-2 may negotiate an encryption protocol and LSP labels with a next MPLS encryptor 130 to establish a LSP connection over another untrusted network 120.

In other embodiments, a single encryption protocol may be used to encrypt data from trusted network 140-1. For example, MPLS encryptor 130-1 may negotiate an encryption protocol with MPLS encryptor 130-3 and may encrypt the data received from trusted network 140-1. The encrypted data may be labeled and transmitted to MPLS encryptor 130-3. MPLS encryptor 130-3 may negotiate with MPLS encryptor 130-2 to use the same encryption protocol that may be used by MPLS encryptor 130-1, for example. MPLS encryptor 130-3 may apply a LSP label to the received data from MPLS encryptor 130-1 to transmit the received data to MPLS encryptor 130-2 without decrypting and re-encrypting the received data, for example.

In still further embodiments, a single untrusted network 120 may be between trusted networks 140-1 and 140-2, for example. In this exemplary embodiment, two MPLS encryptors 130 may be required, and a single encryption protocol and LSP may be negotiated.

The foregoing description of exemplary embodiments provides illustration and description, but is not intended to be exhaustive or to limit the embodiments to the precise form disclosed. Modifications and variations are possible in light of the above teachings or may be acquired from practice of the embodiments.

Also, while series of acts have been described with regard to the flowcharts of FIGS. 4A-4C, the order of the acts may differ in other implementations consistent with principles of the embodiments. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the systems and methods described herein except when explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    negotiating, by a first encryption device, an encryption protocol with a second encryption device;
    negotiating, by the first encryption device, a label switched path (LSP) label with the second encryption device;
    storing, by the first encryption device, the LSP label;
    storing, by the first encryption device, information identifying the encryption protocol in association with the LSP label;
    receiving, by the first encryption device, data from a trusted client device;
    encrypting, by the first encryption device, the data with the negotiated encryption protocol based on the information identifying the encryption protocol;
    applying, by the first encryption device, the LSP label to the encrypted data based on the information identifying the encryption protocol being stored in association with the LSP label; and
    transmitting, by the first encryption device, the encrypted data to the second encryption device through a Multiprotocol Label Switching (MPLS) network.

2. The method of claim 1, where negotiating the encryption protocol includes:
    receiving a signal from the second encryption device indicating the encryption protocol; and
    selecting the encryption protocol from a memory based on the signal received from the second encryption device.

3. The method of claim 1, where the trusted client device is in a trusted network and the MPLS network is an untrusted network.

4. A network device comprising:
    a microprocessor to:
        transmit a request to a second network device to negotiate an encryption protocol,
        negotiate a label switched path (LSP) label with the second network device,
        select the encryption protocol based on a response from the second network device,
        store the LSP label,
        store information identifying the encryption protocol in association with the LSP label,
        receive data from a trusted client device,
        encrypt the data with the encryption protocol based on the information identifying the encryption protocol,
        apply the LSP label to the encrypted data based on the information identifying the encryption protocol being stored in association with the LSP label, and transmit the encrypted data to the second network device through an untrusted Multiprotocol Label Switching (MPLS) network.

5. The network device of claim 4, where the trusted client device is in a trusted network.

6. The network device of clam 4, where the microprocessor is further to:
   switch the encrypted data to an output port before transmitting the encrypted data.

7. A system comprising:
   a first network device to:
      negotiate a first encryption protocol and a first label switched path (LSP) label with a second network device,
      store the first LSP label,
      store first information identifying the first encryption protocol in association with the first LSP label,
      receive data from a trusted network,
      encrypt the data with the first encryption protocol based on the first information identifying the first encryption protocol,
      apply the first LSP label to the encrypted data based on the first LSP label that is stored in association with the information identifying the encryption protocol, and
      transmit the encrypted data to the second network device.

8. The system of claim 7, where the first network device is further to:
   select the first negotiated encryption protocol from a plurality of encryption protocols.

9. The system of claim 7, where the data received from the trusted network is transmitted from a trusted client device.

10. The system of claim 7, further comprising:
    the second network device to:
       receive the encrypted data from the first network device,
       decrypt the encrypted data with the first negotiated encryption protocol,
       negotiate a second encryption protocol and a second LSP label with a third network device,
       re-encrypt the decrypted data with the second encryption protocol,
       apply the second LSP label to the re-encrypted data, and
       transmit the re-encrypted data to the third network device.

11. The system of claim 10, where the second network device negotiates for the second encryption protocol before the first network device encrypts the data with the first negotiated encryption protocol and applies the first LSP label.

12. The system of claim 10, where the second network device is further to:
    store second information identifying the second encryption protocol in association with the second LSP label.

13. A network device comprising:
    a microprocessor to:
       negotiate a first encryption protocol with a first network device,
       negotiate a first label switched path (LSP) label with the first network device,
       store the first LSP label,
       store information identifying the first encryption protocol in association with the first LSP label,
       negotiate a second encryption protocol with a second network device,
       negotiate a second LSP label with the second network device,
       receive encrypted data from the first network device, the encrypted data including the first LSP label,
       decrypt the encrypted data with the first encryption protocol based on the information identifying the first encryption protocol that is stored in association with the first LSP label,
       re-encrypt the decrypted data with the second encryption protocol,
       apply the second LSP label to the re-encrypted data, and
       transmit the re-encrypted data to the second network device.

14. The network device of claim 13, further comprising a memory to store a plurality of encryption protocols, and
    where the microprocessor is further to:
       select the first encryption protocol and the second encryption protocol from the plurality of encryption protocols stored in the memory.

* * * * *